(12) United States Patent
Dufour et al.

(10) Patent No.: US 10,676,592 B2
(45) Date of Patent: Jun. 9, 2020

(54) CELLULOSE FIBER-BASED SUBSTRATE, ITS MANUFACTURING PROCESS AND USE AS MASKING TAPE

(71) Applicant: Ahlstrom-Munksjö Oyj, Helsinki (FI)

(72) Inventors: Menno Dufour, Lyons (FR); Violaine Durand, Ampuis (FR)

(73) Assignee: Ahlstrom-Munksjö Oyj, Helsinki (FI)

( * ) Notice: Subject to any disclaimer, the term of this patent is extended or adjusted under 35 U.S.C. 154(b) by 63 days.

(21) Appl. No.: 15/514,214

(22) PCT Filed: Sep. 25, 2015

(86) PCT No.: PCT/EP2015/072140
§ 371 (c)(1),
(2) Date: Mar. 24, 2017

(87) PCT Pub. No.: WO2016/046381
PCT Pub. Date: Mar. 31, 2016

(65) Prior Publication Data
US 2017/0292043 A1 Oct. 12, 2017

(30) Foreign Application Priority Data
Sep. 26, 2014 (FR) ..................................... 14 59114

(51) Int. Cl.
*C08K 5/1525* (2006.01)
*B32B 27/12* (2006.01)
(Continued)

(52) U.S. Cl.
CPC .............. *C08K 5/1525* (2013.01); *B32B 5/00* (2013.01); *B32B 5/02* (2013.01); *B32B 5/022* (2013.01);
(Continued)

(58) Field of Classification Search
None
See application file for complete search history.

(56) References Cited

U.S. PATENT DOCUMENTS 3,130,118 A * 4/1964 Chapman ................ C07C 45/87
162/175
3,298,987 A * 1/1967 Colgan ................... C08L 29/04
307/108
(Continued)

FOREIGN PATENT DOCUMENTS

| CN | 101472954 A | 7/2009 |
| CN | 202412832 U | 9/2012 |

(Continued)

OTHER PUBLICATIONS

English translation of JP 2007-204687 A (Takagi et al) (published Aug. 16, 2007). (Year: 2007).*

(Continued)

*Primary Examiner* — Vivian Chen
(74) *Attorney, Agent, or Firm* — Laine IP Oy; Mark W. Scott

(57) ABSTRACT

A cellulose fiber-based substrate, at least one side of which is coated with an aqueous mixture composed of: a) at least one water-soluble polymer (WSP) containing hydroxyl groups, b) at least one lactone substituted with at least one linear or branched and/or cyclic $C_8$-$C_{30}$ hydrocarbon chain which may contain heteroatoms, c) at least one crosslinking agent. A method of production and use thereof.

17 Claims, 1 Drawing Sheet

(51) Int. Cl.

| | | |
|---|---|---|
| B32B 7/06 | (2019.01) | |
| B32B 23/02 | (2006.01) | |
| B32B 27/06 | (2006.01) | |
| B32B 27/30 | (2006.01) | |
| D21H 27/00 | (2006.01) | |
| B32B 29/00 | (2006.01) | |
| B32B 27/28 | (2006.01) | |
| B32B 7/00 | (2019.01) | |
| B32B 5/02 | (2006.01) | |
| B32B 27/26 | (2006.01) | |
| B32B 5/00 | (2006.01) | |
| B32B 23/00 | (2006.01) | |
| C09J 7/29 | (2018.01) | |
| B32B 29/02 | (2006.01) | |
| B32B 9/06 | (2006.01) | |
| B32B 27/08 | (2006.01) | |
| B32B 23/06 | (2006.01) | |
| B23B 9/04 | (2006.01) | |
| B32B 7/12 | (2006.01) | |
| B32B 23/14 | (2006.01) | |
| B32B 27/10 | (2006.01) | |
| B32B 9/02 | (2006.01) | |
| B32B 23/16 | (2006.01) | |
| B32B 27/18 | (2006.01) | |
| B32B 23/04 | (2006.01) | |
| B32B 23/08 | (2006.01) | |
| B05D 5/08 | (2006.01) | |
| B05D 3/02 | (2006.01) | |
| B05D 5/10 | (2006.01) | |
| C09J 7/20 | (2018.01) | |
| C09J 7/40 | (2018.01) | |
| C09J 7/21 | (2018.01) | |
| C09D 129/02 | (2006.01) | |
| C09D 103/04 | (2006.01) | |
| C09D 103/08 | (2006.01) | |
| C09D 103/10 | (2006.01) | |
| C09D 101/02 | (2006.01) | |
| C09D 103/02 | (2006.01) | |
| C09D 127/06 | (2006.01) | |
| C09D 131/04 | (2006.01) | |
| C09D 103/06 | (2006.01) | |
| C08L 1/02 | (2006.01) | |
| C08L 3/06 | (2006.01) | |
| C08L 31/04 | (2006.01) | |
| C08L 27/06 | (2006.01) | |
| C08L 29/02 | (2006.01) | |
| C08L 3/02 | (2006.01) | |
| C08L 3/04 | (2006.01) | |
| C08L 3/08 | (2006.01) | |
| C08L 3/10 | (2006.01) | |
| C08K 5/00 | (2006.01) | |
| C08K 5/053 | (2006.01) | |
| C08K 5/29 | (2006.01) | |
| C08K 5/07 | (2006.01) | |
| B32B 9/04 | (2006.01) | |

(52) U.S. Cl.
CPC .............. *B32B 7/00* (2013.01); *B32B 7/06* (2013.01); *B32B 23/00* (2013.01); *B32B 23/02* (2013.01); *B32B 27/06* (2013.01); *B32B 27/12* (2013.01); *B32B 27/26* (2013.01); *B32B 27/28* (2013.01); *B32B 27/30* (2013.01); *B32B 27/304* (2013.01); *B32B 27/306* (2013.01); *B32B 29/00* (2013.01); *B32B 29/02* (2013.01); *C09J 7/29* (2018.01); *D21H 27/00* (2013.01); *B05D 3/02* (2013.01); *B05D 3/0254* (2013.01); *B05D 5/08* (2013.01); *B05D 5/10* (2013.01); *B05D 2203/20* (2013.01); *B32B 7/12* (2013.01); *B32B 9/02* (2013.01); *B32B 9/04* (2013.01); *B32B 9/06* (2013.01); *B32B 23/04* (2013.01); *B32B 23/06* (2013.01); *B32B 23/08* (2013.01); *B32B 23/14* (2013.01); *B32B 23/16* (2013.01); *B32B 27/08* (2013.01); *B32B 27/10* (2013.01); *B32B 27/18* (2013.01); *B32B 29/002* (2013.01); *B32B 2250/03* (2013.01); *B32B 2255/00* (2013.01); *B32B 2255/02* (2013.01); *B32B 2255/12* (2013.01); *B32B 2255/26* (2013.01); *B32B 2262/00* (2013.01); *B32B 2262/04* (2013.01); *B32B 2262/062* (2013.01); *B32B 2307/718* (2013.01); *B32B 2307/748* (2013.01); *B32B 2317/12* (2013.01); *B32B 2317/18* (2013.01); *B32B 2317/20* (2013.01); *B32B 2329/00* (2013.01); *B32B 2329/04* (2013.01); *B32B 2331/00* (2013.01); *B32B 2331/04* (2013.01); *B32B 2405/00* (2013.01); *C08K 5/0025* (2013.01); *C08K 5/053* (2013.01); *C08K 5/07* (2013.01); *C08K 5/29* (2013.01); *C08L 1/02* (2013.01); *C08L 3/02* (2013.01); *C08L 3/04* (2013.01); *C08L 3/06* (2013.01); *C08L 3/08* (2013.01); *C08L 3/10* (2013.01); *C08L 27/06* (2013.01); *C08L 29/02* (2013.01); *C08L 31/04* (2013.01); *C09D 101/02* (2013.01); *C09D 103/02* (2013.01); *C09D 103/04* (2013.01); *C09D 103/06* (2013.01); *C09D 103/08* (2013.01); *C09D 103/10* (2013.01); *C09D 127/06* (2013.01); *C09D 129/02* (2013.01); *C09D 131/04* (2013.01); *C09J 7/20* (2018.01); *C09J 7/201* (2018.01); *C09J 7/21* (2018.01); *C09J 7/40* (2018.01); *C09J 7/401* (2018.01); *C09J 7/405* (2018.01); *C09J 2203/31* (2013.01); *C09J 2400/283* (2013.01); *C09J 2467/006* (2013.01); *Y10T 428/14* (2015.01); *Y10T 428/1476* (2015.01); *Y10T 428/27* (2015.01); *Y10T 428/273* (2015.01); *Y10T 428/277* (2015.01); *Y10T 428/28* (2015.01); *Y10T 428/2839* (2015.01); *Y10T 428/31888* (2015.04); *Y10T 428/31895* (2015.04); *Y10T 428/31906* (2015.04); *Y10T 428/31935* (2015.04); *Y10T 428/31971* (2015.04); *Y10T 428/31975* (2015.04); *Y10T 428/31978* (2015.04); *Y10T 428/31982* (2015.04); *Y10T 428/31993* (2015.04)

(56) References Cited

U.S. PATENT DOCUMENTS

| | | | |
|---|---|---|---|
| 4,056,661 A | | 11/1977 | Sato et al. |
| 4,170,672 A | * | 10/1979 | Moriya ............... C08F 220/54 162/168.1 |
| 4,302,367 A | * | 11/1981 | Cordes ................ D21H 19/50 542/25 |
| 4,337,862 A | * | 7/1982 | Suter ..................... B65D 75/44 383/211 |
| 4,405,408 A | * | 9/1983 | Yoshioka ............. D21H 21/16 162/158 |
| 4,624,985 A | * | 11/1986 | Tsutsumi ............. B41M 5/44 162/135 |
| 5,013,775 A | * | 5/1991 | Oikawa ................ D21H 17/17 524/107 |
| 5,051,468 A | * | 9/1991 | Barnum ................ C08F 8/28 525/59 |

(56) References Cited

U.S. PATENT DOCUMENTS

| | | | | | |
|---|---|---|---|---|---|
| 5,209,973 | A | * | 5/1993 | Wille | C09J 7/04 162/100 |
| 5,472,485 | A | * | 12/1995 | Pandian | D21H 17/66 106/203.3 |
| 5,484,509 | A | * | 1/1996 | Famili | D21H 17/17 106/243 |
| 5,853,542 | A | * | 12/1998 | Bottorff | C08F 226/04 162/168.2 |
| 5,854,356 | A | * | 12/1998 | Bergstrom | C08F 8/42 525/326.5 |
| 6,159,339 | A | * | 12/2000 | Hassler | D21H 21/16 106/215.1 |
| 6,372,035 | B1 | * | 4/2002 | Juppo | D21H 21/16 106/164.4 |
| 2002/0123624 | A1 | * | 9/2002 | Qiao | C08B 31/04 536/110 |
| 2003/0040568 | A1 | * | 2/2003 | Furuta | D21H 17/72 524/520 |
| 2004/0005341 | A1 | * | 1/2004 | Dixit | C08L 29/04 424/401 |
| 2004/0043166 | A1 | * | 3/2004 | Gopal | A22C 13/0013 428/34.8 |
| 2004/0122151 | A1 | * | 6/2004 | Smith | C08L 51/003 524/425 |
| 2004/0241348 | A1 | * | 12/2004 | Koga | B41M 5/0035 428/32.1 |
| 2004/0241435 | A1 | * | 12/2004 | Grittner | D21F 11/00 428/354 |
| 2005/0170173 | A1 | * | 8/2005 | Coguelin | B41M 5/52 428/340 |
| 2005/0277768 | A1 | * | 12/2005 | Buwalda | B01J 13/0052 536/102 |
| 2006/0042767 | A1 | * | 3/2006 | Bhat | B32B 29/00 162/117 |
| 2006/0207735 | A1 | * | 9/2006 | Blanz | D21F 11/00 162/111 |
| 2007/0054068 | A1 | * | 3/2007 | Kimpimaki | B41M 5/5254 428/32.34 |
| 2007/0100306 | A1 | * | 5/2007 | DiZio | A61F 13/58 604/371 |
| 2007/0148377 | A1 | * | 6/2007 | Naito | D21H 19/76 428/32.38 |
| 2008/0233385 | A1 | * | 9/2008 | Ullmann | D21H 21/16 428/320.2 |
| 2009/0139677 | A1 | * | 6/2009 | Hamers | D21H 17/17 162/175 |
| 2009/0178773 | A1 | * | 7/2009 | Brockmeyer | C08F 2/24 162/168.1 |
| 2009/0227718 | A1 | * | 9/2009 | Tanimoto | C08F 261/04 524/321 |
| 2009/0272507 | A1 | * | 11/2009 | Inaoka | D21H 19/20 162/164.6 |
| 2009/0297842 | A1 | * | 12/2009 | Akiyama | D21H 19/24 428/341 |
| 2010/0038266 | A1 | * | 2/2010 | Hallstrom | B32B 27/10 206/223 |
| 2010/0080916 | A1 | * | 4/2010 | Song | B41M 5/52 427/288 |
| 2010/0086709 | A1 | * | 4/2010 | Huang | D21H 21/16 428/32.18 |
| 2010/0099318 | A1 | * | 4/2010 | Suzuki | C09J 133/08 442/151 |
| 2010/0129642 | A1 | * | 5/2010 | Grondahl | C08J 5/18 428/324 |
| 2010/0255297 | A1 | * | 10/2010 | Wada | C09J 7/385 428/343 |
| 2010/0304071 | A1 | * | 12/2010 | Murphy | C09D 129/04 428/41.8 |
| 2010/0305271 | A1 | * | 12/2010 | Mentink | C08G 18/0895 525/54.26 |
| 2010/0310866 | A1 | * | 12/2010 | Yamamoto | C09J 7/385 428/354 |
| 2011/0003097 | A1 | * | 1/2011 | Chen | B41M 5/504 428/32.21 |
| 2011/0183093 | A1 | * | 7/2011 | Wada | C09J 7/385 428/35.7 |
| 2012/0135652 | A1 | * | 5/2012 | Dandenault | C09D 5/024 442/59 |
| 2012/0183769 | A1 | * | 7/2012 | Nasu | C09J 133/24 428/352 |
| 2013/0260116 | A1 | * | 10/2013 | Kawashima | D21H 11/20 428/212 |
| 2013/0280545 | A1 | * | 10/2013 | Husband | D21H 17/25 428/464 |
| 2016/0130763 | A1 | * | 5/2016 | Kawagoe | D21H 27/10 428/413 |
| 2016/0348318 | A1 | * | 12/2016 | Koenig | D21H 19/80 |
| 2017/0292044 | A1 | * | 10/2017 | Dufour | D21H 19/20 |

FOREIGN PATENT DOCUMENTS

| | | | |
|---|---|---|---|
| EP | 2 492 327 | | 8/2012 |
| JP | 61-268784 A | * | 11/1986 |
| JP | 08-176372 A | * | 7/1996 |
| JP | 08-325518 A | * | 12/1996 |
| JP | 09-029756 A | * | 2/1997 |
| JP | 09-104851 A | * | 4/1997 |
| JP | 09-111197 A | * | 4/1997 |
| JP | 09-188858 A | * | 7/1997 |
| JP | 09-194806 A | * | 7/1997 |
| JP | 09-217041 A | * | 8/1997 |
| JP | 09-324172 A | * | 12/1997 |
| JP | 11-028708 A | * | 2/1999 |
| JP | 2001-172585 A | * | 6/2001 |
| JP | 2007-204687 A | * | 8/2007 |

OTHER PUBLICATIONS

English translation of JP 09-217041 A (Matsuki et al) (published Aug. 19, 1997). (Year: 1997).*

International Search Report for PCT/EP2015/072140, dated Dec. 18, 2015, 4 pages.

Written Opinion of the ISA for PCT/EP2015/072140, dated Dec. 18, 2015, 5 pages.

* cited by examiner

CELLULOSE FIBER-BASED SUBSTRATE, ITS MANUFACTURING PROCESS AND USE AS MASKING TAPE

This application is the U.S. national phase of International Application No. PCT/EP2015/072140 filed 25 Sep. 2015, which designated the U.S. and claims priority to FR Patent Application No. 1459114 filed 26 Sep. 2014, the entire contents of each of which are hereby incorporated by reference.

FIELD OF THE INVENTION

The invention relates to a new cellulose fiber-based substrate as well as the production method thereof.

The invention's field of use is the adhesive tape industry. According to one particular embodiment, the invention relates to crepe paper to be used as a substrate for adhesive tapes, particularly masking tapes used in painting. Nevertheless, a flat back paper may also be used instead of crepe paper as a substrate for adhesive tapes.

DESCRIPTION OF THE PRIOR ART

Adhesive tapes are generally composed of a fibrous substrate, notably crepe paper, to which an adhesive layer is applied on at least one side.

These adhesive tapes have applications in various areas, notably in painting, packaging, insulation, coating, the electronics industry, the automotive and aerospace industry, repairs, etc.

Crepe paper is generally characterized by low basis weight, significant elongation rate, and specific flexibility, porosity, and thickness. These features depend on a number of parameters linked to the papermaking steps, notably the creping step.

In practice, crepe paper has a basis weight of 32 to 80 $g/m^2$, and preferably around 39 $g/m^2$. Crepe paper is elongated by 4 to 20% in the machine's direction or more for certain applications (masking tape for curves).

The production of crepe paper is primarily composed of at least two conventional steps, namely:
  the forming of the sheet,
  the pressing.

When the creping is made after the pressing, the process is named "wet creping".

It is possible not to crepe directly after the pressing. In that case, the step of pressing is followed by a step of drying and the creping is made after. Such a process is named "dry creping".

The invention is concerned by both processes.

The pressing and drying steps may notably be performed on a single drying cylinder (e.g., a Yankee cylinder). When it exits the cylinder, the sheet is creped using special scrapers prior to being wound.

The production of masking tape generally occurs in three steps.

In the first step, the crepe paper constituting the substrate is saturated by being impregnated with a binder or latex, generally an SBR-type of latex (for example, 10 to 20 $g/m^2$ SBR (Styrene-Butadiene Rubber) latex). This first saturation step enables:
  improvement of the physical properties of the substrate allowing further processing;
  the creation of a barrier to prevent the migration of the adhesive into the paper;
  good cohesion with the release agent and the adhesive to prevent delamination.

The second step is composed of coating one side of the crepe paper saturated by treatment with a release agent (for example, 4 $g/m^2$ of acrylic latex or silicone).

Lastly, the third step is composed of applying the adhesive onto the second side of the crepe paper (generally between 30 and 40 $g/m^2$) to form the final masking tape. The treatment in the third step allows the tape to be packaged in roll form while facilitating its unwinding by the user.

In practice, the adhesive tape manufacturer obtains crepe paper from the paper manufacturer. The manufacturer saturates the paper and coats it with a release layer on at least one side. It then applies the adhesive layer on the other side to obtain a tape. The whole process therefore requires four distinct steps. Furthermore, the production and subsequent treatment of the paper do not occur on a production line, which obviously affects cost.

In practice, the step of saturating the crepe paper with binders may be incomplete or inhomogeneous when performed outside the production line. With respect to the paint, this results in an imperfectly sealed tape. Masking tapes often pose the problem of minute leakage of paint along the lateral edges of the tape thereby producing a dividing line and imperfect masking.

To overcome all of these drawbacks, the Applicant has developed a new cellulose fiber-based tape substrate, notably crepe paper, requiring a limited number of production steps. Moreover, the substrate has the advantage of being ready to be coated by the adhesive tape manufacturer with an adhesive.

DISCLOSURE OF THE INVENTION

The object of the invention is a substrate, notably a cellulose fiber-based adhesive tape, notably crepe paper but also flat back paper, as well as its method of production and its use as a substrate in the production of adhesive tapes, specifically masking tapes.

The present invention enables crepe paper or flat back paper for masking tapes to be obtained, which:
  notably has at least the same release, dry and wet strength properties as saturated crepe or flat back paper coated on at least one side with a release layer and prepared in the conventional manner,
  is prepared continuously on a single production line,
  after an adhesive is applied it provides of a masking tape with peeling properties and a degree of tack that is compliant with manufacturing standards.

In practice, the invention involves coating at least one side of the substrate with an aqueous composition containing alkyl chains, the said composition acting as both a saturation agent and a release agent.

More specifically, the purpose of the invention is a cellulose fiber-based substrate, particularly that of an adhesive tape, at least one side of which is coated with an aqueous mixture composed of:
  a) at least one water-soluble polymer (WSP) containing hydroxyl groups,
  b) at least one lactone substituted with at least one linear or branched and/or cyclic $C_8$-$C_{30}$ hydrocarbon chain which may contain heteroatoms,
  c) at least one crosslinking agent.

Advantageously, the substituted lactone is a diketene molecule.

Advantageously, the said cellulose fiber-based substrate is crepe paper.

In general, the cellulose substrate, notably the crepe paper or the flat back paper, is composed of cellulose fibers in proportions ranging from 80 to 99% by weight. Advantageously, the refining of the fibers generally ranges from 20 to 50° SR, preferably from 30 to 40° SR.

The term "flat back paper" describes a paper backing which is not creped. These papers are quite flat and smooth when compared to typical creped bases. Also, they have very little elongation (2-4%) when compared to creped grades.

A water-soluble polymer means a polymer which is soluble in water or in an aqueous medium.

Advantageously, the said water-soluble polymer containing hydroxyl groups is selected from the group comprising: polyvinyl alcohol (PVA), starch; oxidized starch, esterified starch, etherified starch, alginate; carboxymethylcellulose (CMC), hydrolyzed or partially hydrolyzed copolymers of vinyl acetate, which, for example, can be obtained by the hydrolysis of ethylene—vinyl acetate (EVA), or vinyl chloride—vinyl acetate, N-vinylpyrrolidone—vinyl acetate, and maleic anhydride—vinyl acetate.

In one advantageous embodiment, said water-soluble polymer is PVA, with an advantageous degree of hydrolysis of at least 95% and a molecular weight preferably between 5,000 and 1,000,000 g/mol, advantageously between 10,000 and 150,000 g/mol. The diketene molecule, notably when it is substituted by alkyl chains (Alkyl Ketene Dimer or AKD) is a dimerized ketene, well known in the paper industry, notably for improving hydrophobicity.

AKD is produced from fatty acid chloride. It is used in the paper industry in the proportion of 0.15%, or 1.5 kg of AKD per tonne of paper. In this case, it is mixed in emulsion form with the cellulose fibers at the wet end of the paper machine.

AKD's diketene group mixed with the paper fibers particularly reacts with the hydroxyl groups in cellulose. Failing this, it hydrolyzes in the presence of water.

Advantageously, the diketene molecule of the invention has the following structure:

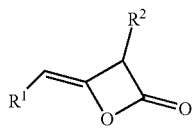

Where $R^1$ and $R^2$ are independent linear or branched and/or cyclic $C_8$-$C_{30}$ hydrocarbon chains which may contain heteroatoms.

Even more advantageously, the diketene molecule may be selected from the group comprising: the diketene molecule with the following structure:

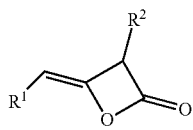

With $R^1$ and $R^2$=linear or branched and/or cyclic, saturated and/or unsaturated hydrocarbon chains with 8 to 30 carbon atoms. Examples of linear saturated chains are: octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyle, octacosyl, nonacosyl, triacontyl. Examples of linear unsaturated chains are: octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, etc.

Advantageously, the crosslinking agent used in the composition of the invention is selected from the group comprising: CHO—Y—CHO, where Y=a linear or branched and/or cyclic hydrocarbon chain which may contain heteroatoms: polyaldehydes, polyisocyanates. It may also be the adipic acid/epoxypropyl diethylenetriamine copolymer (CAS No. 25212-19-5).

Even more advantageously, the crosslinking agent is glyoxal.

The document WO2010/141277 also discloses a substrate coated with a water-soluble polymer, in this case PVA. However, prior to coating, the substrate is treated with glyoxal to cross-link and retain the PVA on the substrate. This treatment does not confer release properties to the substrate.

Without wishing to be bound by any theory, the Applicant has noticed that the aliphatic chains, notably the waxes (for example, carnauba wax) can be used as release agents when they coat one side of the substrate. However, due to their low melting point, waxes tend to migrate into the adhesive once in contact therewith, for example during packaging. This results in the reduction of the adhesive strength of the tape during its final application to a substrate.

One way of avoiding this phenomenon would be to immobilize the fat or aliphatic chains on the substrate. Thus, without wishing to be bound by any theory, the Applicant found that alkylated diketene in aqueous coating mixture with the water-soluble polymer can react with the latter by forming covalent bonds with the hydroxyl groups. This would immobilize the aliphatic chains carried by diketene on the water-soluble polymer (WSP). The presence of a crosslinking agent within the coating mixture allows for the fixation and immobilization of the WSP polymer, having reacted with diketene, on a cellulose fiber-based substrate.

According to one particular embodiment of the invention, the composition used for treating at least one side of the crepe paper is composed of:
  PVA, advantageously 95% hydrolyzed, as the water-soluble polymer,
  a molecule of diketene with the following structure:

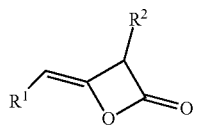

with $R^1$ selected from the group composed of tetradecyl ($C_{14}$), hexadecyl ($C_{16}$), and octadecyl ($C_{18}$),
  and $R^2$ selected from the group composed of tetradecyl ($C_{14}$), hexadecyl ($C_{16}$) and octadecyl ($C_{18}$),
  and glyoxal as the crosslinking agent.

According to one particular embodiment of the invention, the composition used by dry weight percentage is composed of
  between 50 and 99% water-soluble polymer (WSP), advantageously between 60 and 90%,
  between 1 and 50% diketene, advantageously between 10 and 40%,
  between 1 and 20% crosslinking agent, advantageously between 3 and 15%.

The cellulose fiber-based substrate, notably the crepe paper, is coated on at least one side with the composition according to the invention. Advantageously, the dry weight of the composition is between 1 and 20 g/m².

Generally, the substrate of the invention has a basis weight of between 3 and 10 g/m².

In practice, the crepe paper has a basis weight of between 32 and 80 g/m², and preferably around 39 g/m². The elongation of the crepe paper is from 4 to 20% in the machine direction, or more for certain applications (masking tape for curves).

Generally, the dry weight of the composition according to the invention is between 3 and 10 g/m².

This elongation rate or elongation capacity is particularly advantageous for the application of crepe paper as a masking tape for painting. A good elongation rate allows for better handling and shaping of the tape.

Another purpose of the invention is a method of producing the substrate, notably crepe paper-based, according to the invention. The said method is composed of the following steps:

1) forming a cellulose fiber-based substrate;
2) preparing an aqueous composition by mixing:
   at least one water-soluble polymer with hydroxyl groups,
   at least one lactone substituted with at least one linear or branched and/or cyclic $C_8$-$C_{30}$ hydrocarbon chain which may contain heteroatoms, and
   at least one crosslinking agent.
3) coating at least one side of the substrate with the said composition,
4) drying.

Coating techniques known by a person skilled in the art include, among others, the size press, the metering-size press, immersion coating, bar coating, Champion powder coating, air knife coating, scraping knife coating, knife over roll coating, single-layer and multilayer curtain coating, transfer roll coating (reverse roll coating), spray coating, atomized coating, LAS (Liquid Application System) coating, kiss coating, foam coating and any surface treatment method using coating.

As stated above, the production of crepe paper according to the invention takes place on a single production line where the crepe paper is prepared from a pulp of cellulose fibers, creped, and then coated with the composition according to the invention. Downstream of the paper machine, the coated crepe paper is ready to be coated with adhesive, preferably on the side opposite to that treated with the composition of the invention, to form adhesive tapes, for example, masking tapes.

Another purpose of the invention is a masking tape composed of a type of crepe paper according to the invention. In practice, the side not treated with the release composition is coated with an adhesive.

The invention also relates to the use of the substrate disclosed above in the production of masking tape.

BRIEF DESCRIPTION OF THE DRAWINGS

The invention and advantages thereof will become more apparent from the following non-limiting examples given to describe the invention.

EMBODIMENTS OF THE INVENTION

Figure 1:
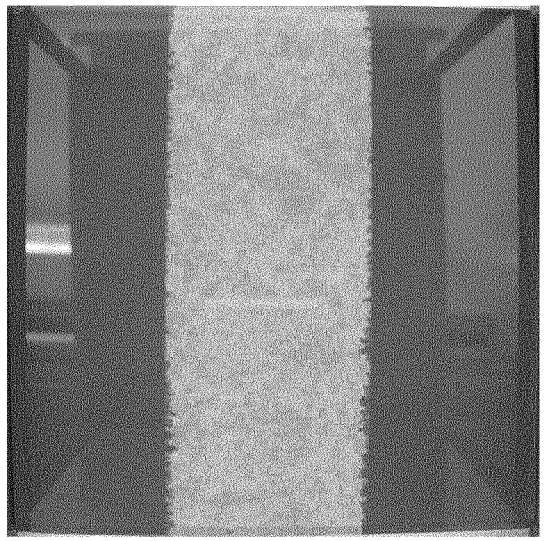
FIG. 1 illustrates a paint test to see the resistance of masking tape against paint for a $1^{st}$ sample.

I/$1^{st}$ Embodiment: Crepe Paper as a Substrate

1: Comparative Test:

A sheet of crepe paper for masking tape (Master Tape™ Classic 100) with a basis weight of 39 g/m² was treated on one side by being coated with an aqueous mixture with a dry weight of 5 g/m² obtained according to the invention.

The composition by dry weight was composed of:
46% dry Celvol® 28/99 (or 46% starch Perfectamyl® A4692),
46% dry AKD (Aquapel® J215 by Ashland)
8% Glyoxal (TSI Cartabond® by Clariant).

The resulting paper had a basis weight of 44 g/m².

This paper was compared with crepe paper of the same type (100/39 g/m² Master Tape™ Classic) treated with an SBR-type of latex (XZ 97235.00 by Styron) and with a 4 g/m² acrylic release agent (Primal® R-550 by Dow).

The following comparative table summarizes the mechanical properties that were measured under dry and wet conditions and shows the results:

| | Invention: 39 g/m² Master tape 100 + 5 g/m² PVA + AKD + Glyoxal | 39 g/m² Master tape 100 + 10 g/m² SBR-type latex + 4 g/m² acrylic release agent |
|---|---|---|
| Basis weight (g/m²) | 44 | 53 |
| dry MD tensile strength (kN/m) - elongation (%) | 2.37-11.6 | 2.72-13 |
| dry CD tensile strength (kN/m) | 1.23 | 1.22 |
| wet MD tensile strength (kN/m) | 1.2 | 1.32 |
| wet CD tensile strength (kN/m) | 0.59 | 0.5 |
| 60 sec Cobb (g/m²) | 13 | 12 |
| Release strength (N/5 cm) | 5.8 | 7.6 |

2: Release Test:

A sheet of 60 g/m² crepe paper was coated with various aqueous compositions using size press treatment. The dry deposition of these compositions was between 6 and 7 g/m².

The aqueous compositions included:
PVA (Moviol® 4/98) (or starch Perfectamyl® A4692),
AKD (AquaperJ215 by Ashland)
Glyoxal (CAS No. 107-22-2) (Cartabond® TSI by Clariant)
Water.

The FINAT FTM 1 test was applied. This test assesses the adaptation of a release substrate to rolling by using a PSA-type adhesive.

Sample 1: A piece of a commercial masking tape (COTEKA® of Bricomarche, 5 cm width) was applied onto the release face of another piece of COTEKA® tape using a 10 kg roller. The peel strengths were measured at a speed of 300 mm/min and an angle of 180°.

PVA/AKD—70/30 sample: A piece of commercial masking tape (COTEKA® by Bricomarché, 5 cm width) was applied using a 10 kg roller on the side of a piece of crepe paper coated with the composition of the invention composed of 70 parts PVA to 30 parts AKD (or 64.4% PVA, 27.6% AKD, and 8% glyoxal by weight).

PVA/AKD—60/40 sample: A piece of commercial masking tape (COTEKA® by Bricomarché, 5 cm width) was applied using a 10 kg roller on the side of a piece of crepe paper coated with the composition of the invention composed of 60 parts PVA to 40 parts AKD (or 55.2% PVA, 36.8% AKD, and 8% glyoxal by weight).

PVA/AKD—50/50 sample: A piece of commercial masking tape (COTEKA® by Bricomarché, 5 cm width) was applied using a 10 kg roller on the side of a piece of crepe paper coated with the composition of the invention composed of 50 parts PVA to 50 parts AKD (or 46% PVA, 46% AKD and 8% glyoxal, by weight).

| Standard separation strength | Release strength (N/5 cm) |
|---|---|
| Sample 1 (COTEKA ®) | 7.24 |
| PVA/AKD - 70/30 sample | 8.26 |
| PVA/AKD - 60/40 sample | 7.08 |
| PVA/AKD - 50/50 sample | 5.87 |

It was noted that the peel strengths of the invention were on par with those of the commercial product, between 5 to 8 N/5 cm, and they varied according to the amount of AKD introduced into the mixture. The greater the amount of AKD in the mixture, the lower the peel strength. This shows the release property of the alkyl chains present within the AKD.

3: FINAT FTM 11 Test—Subsequent Adhesion:

The "subsequent adhesion release" is the force required at a given speed and angle to tear a tape coated with an adhesive adhered to a standard test plate, this tape having previously been in contact with the side of a substrate of the same type coated with a release agent under specific temperature and humidity conditions.

The aim of this test is to measure the possible transfer of the release agent into the adhesive layer.

The percentage of subsequent adhesion is expressed as the ratio between the measured adhesion compared with the adhesion obtained by a similar control tape which was not in contact with a substrate coated with a release agent. The adhesion value of the control tape was measured at 10.97 N/5 cm.

| Subsequent separation strength | Separation strength (N/5 cm) | % Loss/Gain |
|---|---|---|
| Sample 1 (COTEKA ®) | 10.52 | −4.1% |
| PVA/AKD - 70/30 sample | 10.43 | −4.9% |
| PVA/AKD - 60/40 sample | 10.45 | −4.7% |
| PVA/AKD - 50/50 sample | 9.91 | −9.6% |

The amount of loss of adhesion strength of substrates related to the invention was similar to the commercial product. There is therefore little or no transfer of AKD into the adhesive.

4: Peel Strength After Pressure Aging Test (70 g/cm$^2$) at Room Temperature in Accordance with the FINAT FM 10 Test:

A commercial masking tape (COTEKA® by Bricomarche, 5 cm width) was applied on the different types of crepe paper and COTEKA® tapes using a 10 kg roller under the same conditions as Example 2. The samples were pressurized (70 g/cm$^2$) at room temperature (23° C. and 50% humidity) for 20 hours. They were then kept for at least 4 hours at 23° C. and 50% relative humidity. The peel strengths were measured at a speed of 300 mm/min and an angle of 180°—FINAT FM1 test.

| Standard separation strength | Separation strength (N/5 cm) | | | Average | % Loss/Gain |
|---|---|---|---|---|---|
| Sample | 1 | 2 | 3 | | |
| Sample 1 (COTEKA ®) | 7.12 | 7.23 | 6.88 | 7.08 | −2.26 |
| PVA/AKD - 70/30 sample | 7.57 | 7.31 | 7.56 | 7.48 | −9.41 |
| PVA/AKD - 60/40 sample | 7.67 | 6.78 | 6.72 | 7.06 | −0.28 |
| PVA/AKD - 50/50 sample | 5.63 | 5.63 | 5.88 | 5.71 | −2.61 |

The values were compared with the values of Example 2 (Separation strength before the aging test). It was noted that the change in strength of both the commercial product and the substrate of the invention was low (loss between 2 and 9%) and therefore the peel strengths were stable over time under pressure at room temperature.

5: FINAT FTM 11 Test—Subsequent Adhesion After Aging at Room Temperature:

"Subsequent adhesion release" is the force at a given speed and angle required to tear a tape coated with an adhesive adhered to a standard test plate, this tape having previously been in contact with the side of a substrate of the same type coated with a release agent under specific temperature and humidity conditions.

The percentage of subsequent adhesion is expressed as the ratio between the adhesion measured compared to the adhesion obtained by a similar control tape which was not in contact with a substrate coated with a release agent. The adhesion value of the control tape was measured at 10.97 N/5 cm.

| | Release strength (N/5 cm) | % Loss/Gain |
|---|---|---|
| Sample 1 (COTEKA ®) | 10.02 | −8.6 |
| PVA/AKD - 70/30 sample | 10.41 | −5.1 |
| PVA/AKD - 60/40 sample | 9.84 | −10.3 |
| PVA/AKD - 50/50 sample | 9.41 | −14.22 |

The amount of loss of adhesion strength of substrates related to the invention was similar to the commercial product. There is therefore little or no transfer of AKD into the adhesive. The prototype with 50 parts of AKD shows a lower value, involving a slight potential migration of AKD into the adhesive.

6: Peel Strength After Pressure Aging Test (70 g/cm$^2$) at 70° C. in Accordance with the FINAT FM 10 Test:

A commercial masking tape (COTEKA® by Bricomarchê, 5 cm width) was applied on the different types of crepe paper and COTEKA® tapes using a 10 kg roller under the same conditions as Example 2. The samples were pressurized (70 g/cm$^2$) at 70° C. for 20 hours. They were then kept for at least 4 hours at 23° C. and 50% relative humidity. The peel strengths were measured at a speed of 300 mm/min and an angle of 180°—FINAT FM1 test.

| Standard release | Release strength (N/5 cm) | % Loss/Gain |
|---|---|---|
| Sample 1 (COTEKA ®) | 8.26 | 14.09 |
| PVA/AKD - 70/30 sample | 9.89 | 19.78 |
| PVA/AKD - 60/40 sample | 10.68 | 50.92 |
| PVA/AKD - 50/50 sample | 9.11 | 55.28 |

The change in the peel strengths of the substrate of the invention with 30 parts of AKD shows a change in its release properties similar to the commercial product (15-20%). In contrast, the other two samples of the invention show quite a significant change (+50%).

7: FINAT FTM 11 Test—Subsequent Adhesion After Aging at 70° C.:

The "subsequent adhesion release" is the force required at a given speed and angle to tear a tape coated with an adhesive adhered to a standard test plate, this tape having previously been in contact with the side of a substrate of the same type coated with a release agent under specific temperature and humidity conditions.

The percentage of subsequent adhesion is expressed as the ratio between the measured adhesion compared to the adhesion obtained by a similar control tape which was not in contact with a substrate coated with a release agent. The adhesion value of the control tape was measured at 10.97 N/5 cm.

| Subsequent separation strength | Separation strength (N/5 cm) | % Loss/Gain |
| --- | --- | --- |
| Sample 1 (COTEKA ®) | 9.76 | −11 |
| PVA/AKD - 70/30 sample | 10.01 | −8.7 |
| PVA/AKD - 60/40 sample | 9.21 | −16 |
| PVA/AKD - 50/50 sample | 7.43 | −32.2 |

The amount of loss of adhesion strength of substrates with 30 parts of AKD was similar to the commercial product. There is therefore little or no transfer of AKD into the adhesive for this prototype. In contrast, the prototype with 50 parts of AKD shows a much lower value (loss of adhesion strength of more than 30%) involving a potential migration of AKD into the adhesive.

8: Peel Strength After Aging (7 days) at High Temperature (65° C.) and High Humidity (85% Relative Humidity)—AFERA #4003 (EN 12024) Test:

A commercial masking tape (COTEKA® by Bricomarché, 5 cm width) was applied to the different types of crepe paper of the invention and to itself using a 10 kg roller. The samples were then kept as such (without pressure) in a climate simulation chamber at 65° C. and 85% humidity for 7 days (AFERA #4003 test). The peel strengths were measured at a speed of 300 mm/min and an angle of 180°.

| Sample (peel strength: N/5 cm) | Initial peel strength | Peel strength after aging | % change |
| --- | --- | --- | --- |
| Sample 1 (COTEKA ®) | 7.24 | 9.99 | +38% |
| PVA/AKD - 70/30 sample | 8.26 | 9.95 | +20% |
| PVA/AKD - 60/40 sample | 7.08 | 9.37 | +32% |
| PVA/AKD - 50/50 sample | 5.87 | 8.34 | +42% |

It may therefore be noted that the different types of crepe paper of the invention perform similarly or better (more stable peel strength for the PVA/AKD—70/30 mixture) than the commercial product (i.e.: COTEKA®).

II/2$^d$ Embodiment: Flat Back Paper as a Substrate

Release Test:

A sheet of 62 g/m$^2$ flat back paper was coated with various aqueous compositions using size press treatment. The dry deposition of these compositions was 8 g/m$^2$.

The aqueous compositions included:
PVA (Moviol® 4/98) (or starch Perfectamyl® A4692),
AKD (Aquapel®J215 by Ashland)
Glyoxal (CAS No. 107-22-2) (Cartabond® TSI by Clariant)
Water.

The FINAT FTM 1 test was applied. This test assesses the adaptation of a release substrate to rolling by using a PSA-type adhesive.

Sample 1: A piece of a commercial masking tape (COTEKA® of Bricomarché, 5 cm width) was applied onto the release face of another piece of COTEKA® tape using a 10 kg roller. The peel strengths were measured at a speed of 300 mm/min and an angle of 180°.

PVA/AKD—70/30 sample: A piece of commercial masking tape (COTEKA® by Bricomarché, 5 cm width) was applied using a 10 kg roller on the side of a piece of a flat back paper (AHLSTROM Mastertape™ DELICATE 400—62 g/m$^2$) coated with 8 g/m$^2$ of the composition of the invention composed of 70 parts PVA to 30 parts AKD (or 64.4% PVA, 27.6% AKD, and 8% glyoxal by weight).

Starch/AKD—70/30 sample: A piece of commercial masking tape (COTEKA® by Bricomarché, 5 cm width) was applied using a 10 kg roller on the side of a piece of a flat back paper ((AHLSTROM Mastertape™ DELICATE 400—62 g/m$^2$) coated with 8 g/m$^2$ of the composition of the invention composed of 70 parts Starch to 30 parts AKD (or 64.4% starch, 27.6% AKD, and 8% glyoxal by weight).

| Standard separation strength | Release strength (N/5 cm) |
| --- | --- |
| Sample 1 (COTEKA ®) | 7.24 |
| PVA/AKD - 70/30 sample | 6.89 |
| Starch/AKD - 70/30 sample | 5.956 |

It was noted that the peel strengths of the invention were on par with those of the commercial product, between 5 to 8 N/5 cm. This shows the release property of the alkyl chains present in AKD.

III/Paint Test

The aim of paint test is to see the resistance of masking tape against paint. Especially, the migration of the paint on the edges (paint back) is observed. This test has been developed by the Applicant.

1/Preparation of the Sample

Sample 1: A commercial masking tape (COTEKA® by Bricomarché, 5 cm width).

Sample 2: A sheet of crepe paper for masking tape (Mastertape™ Smart line 300) with a basis weight of 55 g/m$^2$ was treated by size press at machine scale with an aqueous mixture PVA/AKD (50/50 in parts or 46% PVA, 46% AKD and 8% glyoxal by weight), with a dry weight of 5 g/m$^2$.

Sample 3: A sheet of flat back paper ((AHLSTROM Mastertape™ DELICATE 400-62 g/m$^2$)) with a basis weight of 62 g/m$^2$ was treated by size press at lab scale with an aqueous mixture PVA/AKD (70/30 in parts or 64.4% PVA, 27.6% AKD and 8% glyoxal by weight), with a dry weight of 8 g/m2.

Sample 2 and 3 are then coated on the smoother side with 25 to 30 g/m$^2$ of an adhesive (DowCorning Binder ROBOND PS9005 (MS: 57%)).

2/ Application of the Paint

Sample 1 and samples 2 and 3 (these later being cut in band of 5 cm width) are applied each on a 13 cm by 13 cm transparent glass plate. 3.5 to 3.7 g of paint is applied on all the surface of the plate.

The plates are left to dry at least 4 hours.

3/Measurement of the Migration of the Paint

Each plate is turned and a transparent mesh having holes of 1 mm is applied against the plate. Surface of migration is then calculated by counting the number of holes filed with the paint/cm. lower is the surface of paint, lower is the migration and better is the marking tape.

4/Results

FIG. 1: Sample 1 corresponds to COTEKA. The migration is 10.6 mm²/cm.

Figure 2:
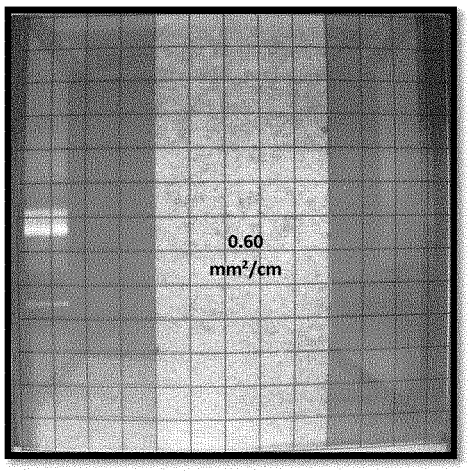
FIG. 2: illustrates a paint test to see the resistance of masking tape against paint for a $2^d$ sample sample.

FIG. 2: sample 2 of the invention. The migration is 0.6 mm²/cm.

Figure 3:
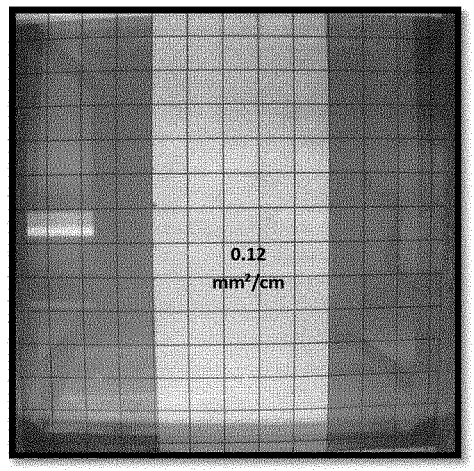
FIG. 3 illustrates a paint test to see the resistance of masking tape against paint for a $3^d$ sample.

FIG. 3: sample 3 of the invention. The migration is 0.12 mm²/cm.

The invention claimed is:

1. An adhesive tape comprising:
   (i) a cellulose fiber-based paper substrate,
   (ii) a release coating layer on at least one surface of the paper substrate, and
   (iii) an adhesive layer on another surface of the paper substrate opposite to the release coating layer, wherein the release coating layer comprises a reaction product from an aqueous mixture comprised of, based on dry weight percentage:
      (a) 50-99% of at least one water-soluble polymer (WSP) containing hydroxyl groups,
      (b) 1-50% of at least one diketene compound, wherein the at least one diketene compound is substituted with at least one linear, branched and/or cyclic $C_8$-$C_{30}$ hydrocarbon chain which may contain heteroatoms, and
      (c) at least one crosslinking agent,
      wherein the at least one diketene compound is immobilized on the WSP and the WSP is immobilized on the at least one surface of the paper substrate.

2. The adhesive tape according to claim 1, wherein the paper substrate is crepe paper.

3. The adhesive tape according to claim 2, wherein the adhesive tape is a masking tape.

4. The adhesive tape to claim 1, wherein the water-soluble polymer (WSP) containing hydroxyl groups is selected from the group consisting of polyvinyl alcohol (PVA); starch; oxidized starch; esterified starch; etherified starch; vinyl acetate copolymers, ethylene-vinyl acetate copolymers, vinyl chloride-vinyl acetate copolymers, N-vinylpyrrolidone-vinyl acetate copolymers, maleic anhydride-vinyl acetate copolymers; vinyl acetate.

5. The adhesive tape according to claim 4, wherein the WSP is a hydrolyzed or partially hydrolyzed ethylene-vinyl acetate (EVA) copolymer or a hydrolyzed or partially hydrolyzed vinyl chloride-vinyl acetate copolymer.

6. The adhesive tape according to claim 1, wherein the at least one diketene compound comprises a diketene molecule of the following structure:

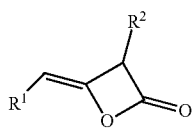

wherein $R^1$ and $R^2$ are independent linear or branched and/or cyclic $C_8$-$C_{30}$ hydrocarbon chains which may contain heteroatoms.

7. The adhesive tape according to claim 1, wherein the crosslinking agent is selected from the group consisting of CHO—Y—CHO where Y is a linear or branched hydrocarbon chain and/or a cyclic molecule which may contain heteroatoms, polyaldehydes, polyisocyanates, and adipic acid/epoxypropyl diethylenetriamine copolymer.

8. The adhesive tape according to claim 1, wherein
   (a) the at least one water-soluble polymer (WSP) is polyvinyl alcohol (PVA),
   (b) the at least one diketene compound is at least one alkylated diketene compound having the following structure:

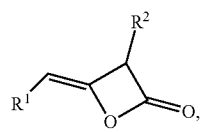

wherein
   $R^1$ is selected from the group consisting of tetradecyl ($C_{14}$), hexadecyl ($C_{16}$) and octadecyl ($C_{18}$), and $R^2$ is selected from the group consisting of tetradecyl ($C_{14}$), hexadecyl ($C_{16}$) and octadecyl ($C_{18}$), and
   (c) the at least one crosslinking agent is glyoxal.

9. The adhesive tape according to claim 1, wherein the coating composition comprises, based on dry weight percentage, between 1 and 20% of the at least crosslinking agent.

10. The adhesive tape according to claim 9, wherein the release coating layer comprises, based on a dry weight percentage:
    (a) between 60 and 90% of the water-soluble polymer (WSP),
    (b) between 10 and 40% of the at least one diketene compound, and
    (c) between 3 and 15% of the crosslinking agent.

11. The adhesive tape according to claim 1, wherein the coating composition of the release coating layer is present in the adhesive tape in an amount between 1 and 20 g/m² based on a dry basis weight.

12. The adhesive tape according to claim 11, wherein the release coating layer is present in an amount between 3 and 10 g/m² based on the dry basis weight.

13. A method of producing the adhesive tape according to claim 1 which comprises the steps of:
    (1) forming the cellulose fiber-based paper substrate;
    (2) forming the reaction product from the aqueous mixture comprising, based on dry weight percentage:
       (a) 50-99% of the at least one water-soluble polymer (WSP) containing hydroxyl groups,
       (b) 1-50% of the at least one diketene compound substituted with at least one linear or branched and/or cyclic $C_8$-$C_{30}$ hydrocarbon chain which may contain heteroatoms, and
       (c) the at least one crosslinking agent;
    (3) coating the at least one surface of the paper substrate with the reaction product,
    (4) drying the coating on the at least one surface of the paper substrate to form the release coating layer, and
    (5) applying the adhesive layer onto another surface of the coated substrate opposite to the release coating layer.

14. The method of claim 13, wherein the at least one water-soluble polymer containing hydroxyl groups comprises polyvinyl alcohol, wherein the at least one diketene compound comprises alkyl ketene dimer, and wherein the release coating layer comprises from 50-70 parts of the polyvinyl alcohol to 30-50 parts of the alkyl ketene dimer.

15. The adhesive tape of claim 1, wherein the release coating layer comprises from 50-70 parts of the at least one water-soluble compound to 30-50 parts of the at least one diketene compound.

16. The adhesive tape of claim 15, wherein the at least one water soluble compound comprises polyvinyl alcohol or starch, and wherein the at least one diketene compound comprises alkyl ketene dimer.

17. The adhesive tape of claim 1, wherein the at least one water-soluble polymer containing hydroxyl groups comprises polyvinyl alcohol, wherein the at least one diketene compound comprises alkyl ketene dimer, and wherein the release coating layer comprises from 50-70 parts of the polyvinyl alcohol to 30-50 parts of the alkyl ketene dimer.

* * * * *